United States Patent

[11] 3,589,143

[72] Inventor Robert S. Batt
 Barby Nr. Rugby, England
[21] Appl. No. 843,572
[22] Filed July 22, 1969
[45] Patented June 29, 1971
[73] Assignee The Torrington Company Limited
 Coventry, Warwickshire, England
[32] Priority July 26, 1968
[33] Great Britain
[31] 35,693/68

[54] NEEDLE BEARINGS ESPECIALLY FOR UNIVERSAL JOINTS
 9 Claims, 4 Drawing Figs.
[52] U.S. Cl. ................................................ 64/17 A, 308/212
[51] Int. Cl. .............................................. F16c 11/02, F16c 33/58

[50] Field of Search .............................. 308/212, 213, 216; 64/17 A

[56] References Cited
UNITED STATES PATENTS
2,976,091  3/1961  Miller, Jr. ............... 308/212

Primary Examiner—Martin P. Schwadron
Assistant Examiner—Frank Susko
Attorneys—Carl R. Harten, David W. Tibbott and Frank S. Troidl ABSTRACT: The invention provides a roller bearing having an outer race for mounting in a shaft, housing or similar bore and having an external recess or groove at one end of the bearing race to receive an annular washer or equivalent clip extending radially beyond the race, the clip acting to limit displacement of the bearing in one axial direction in the bore.

INVENTOR:
ROBERT S. BATT

INVENTOR
ROBERT S. BATT
BY
Frank S. Troidl
ATTORNEY

NEEDLE BEARINGS ESPECIALLY FOR UNIVERSAL JOINTS

This invention concerns rolling bearings and relates more particularly to needle bearings for use in applications such as universal joints.

One problem sometimes encountered in the fabrication of universal joints is axial displacement of the bearings out of the two halves of the joint due to thrust between the joint halves generally resulting from unbalance in the joint.

The invention seeks to provide a bearing construction which in a simple manner will prevent displacement of the bearing from such causes.

According to the present invention, in a bearing comprising an outer bearing race containing a plurality of bearing rollers, one end of the bearing race is formed externally with a radially inwardly directed recess arrangement adapted to receive a circular clip, washer or equivalent member for defining a radial flange around said race.

The recess may be circumferentially continuous or it may consist of a series of circularly spaced indentations each adapted for engagement by an internal tooth of a star washer.

Preferably the recess is a groove circumscribing the end region of the race and, for example in a bearing race which itself is deep drawn or pressed from sheet metal, is most conveniently defined by forming a double fold at the end region of the race, that is to say, by forming said end region with an axially outermost and radially directed fold slightly axially spaced from an adjacent, radially inwardly directed fold.

In the use of the bearing proposed by the invention, the bearing having been inserted in a bore in a housing member intended to receive it, a clip or washer may then be engaged in the recess arrangement to constitute a radial flange external to the race and thereafter preventing the bearing from being withdrawn from the bore.

The invention will be described further, by way of example, with reference to the accompanying drawings, in which.

Figure 1:
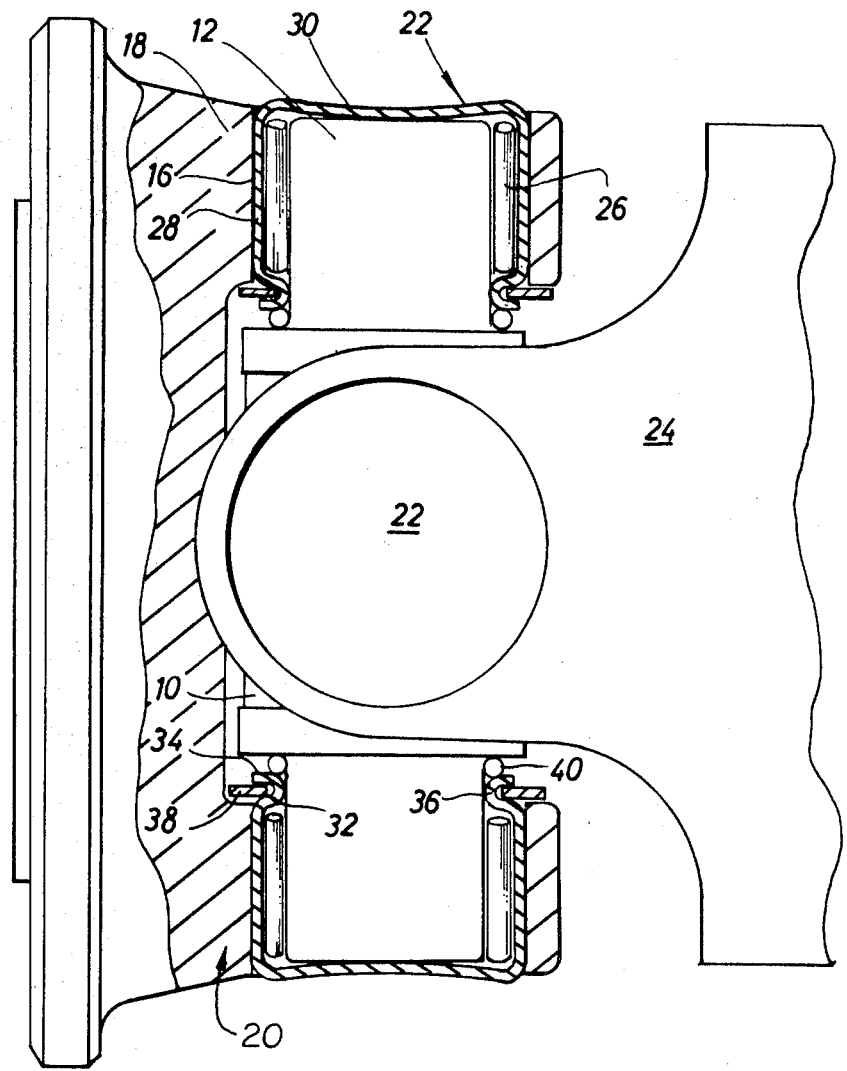
FIG. 1 is an elevation, partly in section of a universal joint incorporating bearings embodying the invention.

The universal joint shown in FIG. 1 comprises a central block 10 which is bored to receive mutually perpendicular shafts, of which one shaft 12 is visible in the drawing. Opposite ends of the shaft 12 are received in apertures 16 or arms 18 of a fork member 20 and a needle bearing generally designated 22 is interposed between each shaft end and the arm 18 in which it is housed. A second fork member 24 is connected to the central block 10 in a similar manner.

The needle bearings 22 each include a plurality of needle rollers 26 located within a cylindrical outer race 28 which is deep drawn from sheet metal in the form of a cup having a closed outer end 30. For the purpose of preventing axial movement of the rollers sufficient to enable them to fall out of the race 28, the opposite end of the latter is formed with a radially inwardly directed lip or flange 32.

Spaced slightly axially outwardly of the lip 32, the bearing race 28 is then formed, for example by a rolling operation with a second and radially outwardly directed lip 34 which cooperates with the lip 32 to define a recess 36 externally circumscribing the bearing race end. This recess 36 provides a seating for a circlip 38 which, when the bearing 22 is positioned on the shaft 12 is intended to engage behind the arm 18 of fork member 20 in order to prevent displacement of the bearing in the event that thrust forces should arise. As illustrated, the bearing may be sealed by an O-ring 40 interposed between the lip 34 and the center block 10.

Figure 2:
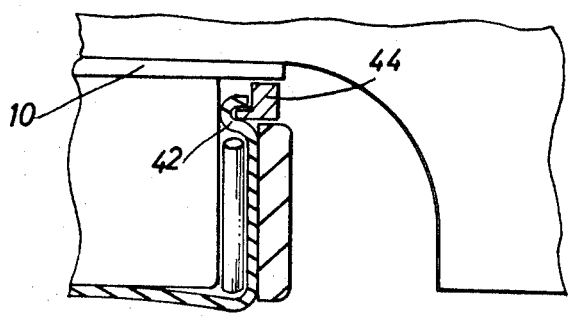
FIG. 2 is a sectional detail illustrating a modification of the invention.

In the alternative embodiment of the invention shown in FIG. 2, the simple circlip is replaced by an annular washer, preferably of a plastics material such as nylon or polytetrafluoroethylene which has a radial portion 42 for seating in the groove 36 and a substantial axial portion 44 of a depth sufficient to bear against the center block 10 for the purpose both of acting as a thrust washer and also of sealing the bearing against the entry of foreign matter.

Figure 3:
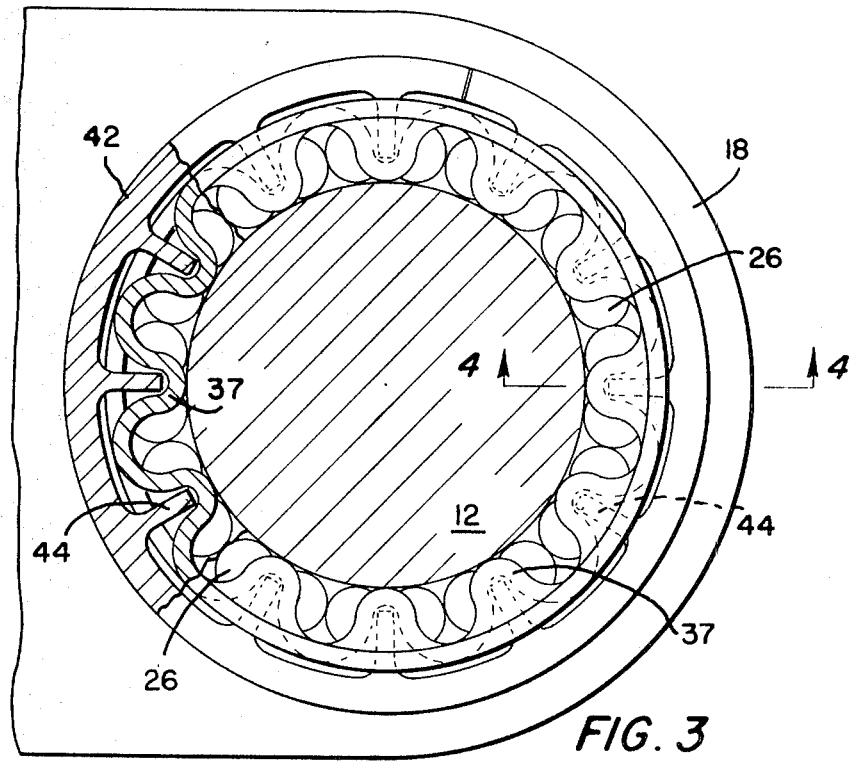
FIG. 3 is a sectional plan view with a portion cut away showing another modification of the invention.
Figure 4:
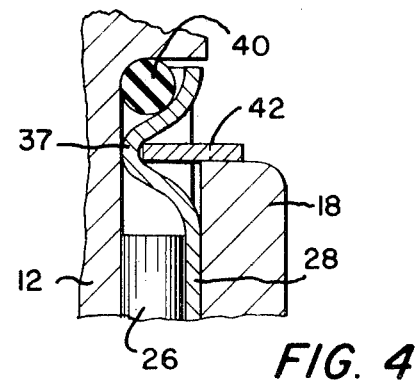
FIG. 4 is a sectional view taken along line 4-4 of FIG. 3.

In the modification shown in FIGS. 3 and 4 indentations 37 in the outer race replace the groove 36, and the simple circlip 38 is replaced by a star washer 42 having inward projections that fit in the indentations which are spaced closely enough to prevent loss of rollers prior to assembly of the bearing on the shaft.

I claim:

1. In a bearing comprising an outer bearing race containing a plurality of bearing rollers, the improvement wherein one end of the bearing race is formed externally with a radially inwardly directed recess arrangement to prevent axial movement of the bearing rollers sufficient to fall out of the bearing race, and wherein an annular washer member for defining a radial flange around said race is received within said recess arrangement.

2. A bearing as set forth in claim 1, wherein the recess is circumferentially continuous.

3. A bearing as set forth in claim 1, wherein the recess consists of a series of circularly spaced indentations formed in the race and each adapted for engagement by an internal tooth of a star washer.

4. A bearing as set forth in claim 1 wherein the recess is a groove circumscribing the end region of the race.

5. A bearing as set forth in claim 1, wherein the washer member comprises a radial portion engaged in said recess and an axial portion depending from the radially outer region of said radial portion, said axial portion having an axial length substantially greater than the axial thickness of the radial portion.

6. A bearing as set forth in claim 4, wherein the bearing race is deep drawn from sheet metal and the groove is defined by forming a double fold at the end region of the race, said fold comprising an axially outermost and radially directed portion of said end region which is slightly axially spaced from an adjacent and radially inwardly directed race end portion.

7. A universal joint comprising a central block wherein are mounted a pair of mutually perpendicular shafts, said block and said shafts together constituting a cruciform member, a pair of fork members each having apertured arms by means of which a respective fork member is engaged with one of said shafts and a roller bearing interposed between each arm and the shaft portion which it engages, said bearing comprising an outer race, a plurality of rollers contained in said outer race, one end of said race being formed externally with a radially inwardly directed recess to prevent axial movement of the bearing rollers sufficient to fall out of the bearing race, and an annular washer received within said recess for defining a radial flange around said race.

8. A universal joint as set forth in claim 7, wherein a sealing ring is interposed between the center block and the adjacent end of each bearing race.

9. A universal joint as set forth in claim 7, wherein the axially extending portion of each washer member bears against the center block to constitute both a thrust washer and a seal.